W. G. ROYCE.
ADJUSTABLE SELF LUBRICATING BEARING MEANS.
APPLICATION FILED JUNE 7, 1917.
1,285,397.
Patented Nov. 19, 1918.
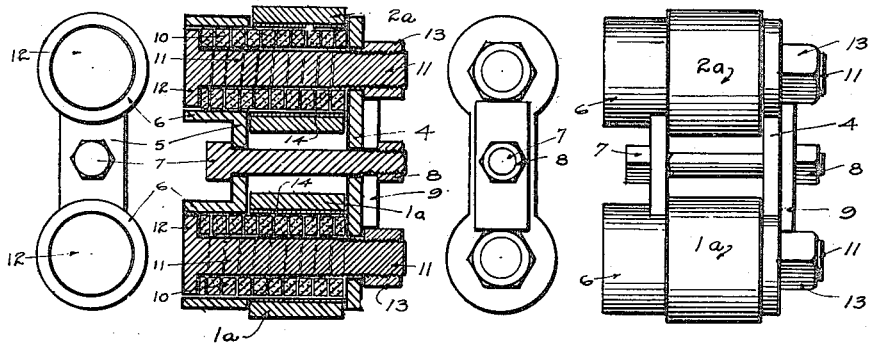
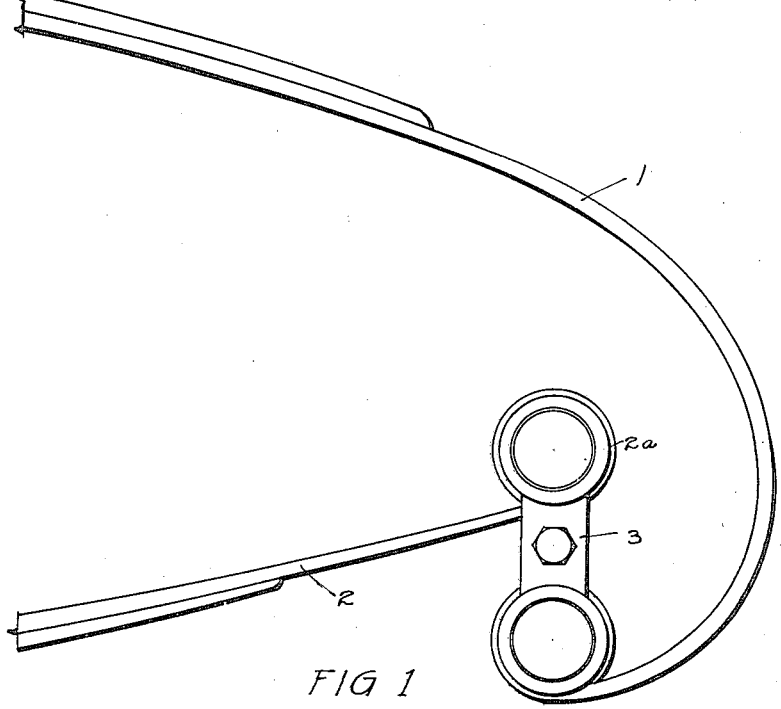

UNITED STATES PATENT OFFICE.

WALTER G. ROYCE, OF PORTLAND, OREGON, ASSIGNOR OF ONE-THIRD TO L. G. DE YOUNG AND ONE-THIRD TO ALBERT COURTS, BOTH OF PORTLAND, OREGON.

ADJUSTABLE SELF-LUBRICATING BEARING MEANS.

1,285,397.

Specification of Letters Patent. Patented Nov. 19, 1918.

Application filed June 7, 1917. Serial No. 173,415.

*To all whom it may concern:*

Be it known that I, WALTER G. ROYCE, a citizen of the United States, residing in the city of Portland, county of Multnomah, and State of Oregon, have invented certain new and useful Improvements in Adjustable Self-Lubricating Bearing Means, of which the following is a specification.

My invention relates to adjustable self-lubricating bearing means, and more particularly to an improved bearing means in which a lubricating composition, in spiral form can be used in such a way that it is adjustable, or compressible, in a simple and effective manner, whereby to prevent looseness and noise in the bearing, and at the same time operate as an effective lubricant for such bearing.

In order to illustrate my invention I have shown it on the accompanying sheet of drawings as constituting the bearings in a spring shackle, which I will now describe.

Figure 1 is a partial view of top and bottom springs connected with a shackle embodying my invention;

Fig. 2 is an end view of the spring shackle;

Fig. 3 is a vertical, sectional view therethrough;

Fig. 4 is an opposite end view thereof; and

Fig. 5 is a side elevation thereof.

Referring now more in detail to the drawings, 1 and 2 designate top and bottom springs, and 3 a spring shackle connecting the ends of said springs, and embodying my invention, which I will now describe.

Mounted on opposite sides of the spring eyes 1ª and 2ª, are side plates 4 and 5, the side plate 5 having formed therein cylindrical-like portions 6—6, adapted to register with the spring eyes 1ª—2ª, when said plate 5 is mounted at one side thereof. Said plates 4 and 5 are connected by means of a bolt 7, passing therethrough between the spring eyes 1ª and 2ª, and provided on its opposite end with a nut 8. A washer plate 9, may be placed against the side of the plate 4, as shown, if desired.

Inserted in each of the spring eyes 1ª and 2ª, is a spiral, composition, combination lubricant and bearing 10, through the center of which passes a bolt 11, having a head 12, adapted to fit within the cylindrical portion 6 of the side plate 5, said bolts 11—11 passing through the side plate 4 and provided on their opposite ends with nuts 13—13, whereby as said nuts 13, are tightened, the heads 12 of said bolts 11 are drawn into the cylindrical portions of the plate 5, in such a way as to compress the spiral, bearing, composition lubricant 10. This longitudinal compression of said lubricant bearing causes a circumferential expansion thereof within the spring eyes 1ª and 2ª. The composition lubricant and bearing 10 is commonly known as spiral packing, composed of asbestos, graphite and oil. The composition is not claimed as my invention as this is old.

It will be noted that the cylindrical portions of the plate 5, form in effect reservoirs, or pockets, into which the ends of the composition, lubricant bearings project, and within which the heads 12—12 of the bolts 11—11 move, said composition, bearing lubricant being compressed between the head 12 and the plate 4, without causing any binding effect between the plates 4 and 5, on the spring eyes 1ª and 2ª. The spring eyes 1ª and 2ª may be provided with any suitable bearing lining, as indicated at 14—14.

Thus I have provided a very simple and inexpensive, yet most effective means for lubricating such bearings as that here illustrated and capable of adjustment to take up wear and looseness, and thus prevent any noise from the bearing.

I am aware that slight changes can be made in my invention as here illustrated, without departing from the spirit thereof, and I do not, therefore, limit the invention to the embodiment or details thereof here shown, except as I may be limited by the hereto appended claims.

I claim:

1. In combination with two members, one within the other, a combination bearing and lubricating element around the inner member and within the outer member, and adjustable means for gradually compressing said element longitudinally and expanding the same circumferentially within the outer member.

2. In combination with two members, mounted one within the other, a combination bearing and lubricating element spirally disposed around the inner member and within the outer member, and adjustable means for gradually compressing said element longitudinally and expanding the same circumferentially within the outer member.

3. In combination with an outer member and an inner member, side plates at the opposite sides of said outer member, one of said side plates being provided with a cylindrical portion in register with said outer member, a combination bearing and lubricating element mounted around said inner member within said outer member and the cylindrical portion of said side plate, and means for moving said inner member in such manner as to compress said combination bearing and lubricating element longitudinally and to cause a circumferential expansion thereof, substantially as described.

4. In combination a bearing eye, a pair of side plates at the opposite sides thereof, one of said plates having a cylindrical portion in register with said bearing eye, a bolt extending through said side plates and having a head adapted to fit and move within the cylindrical portion of said side plate, and provided at its opposite end with a nut on the outside of said other side plate, and a combination bearing and lubricating element mounted within said eye and within the cylindrical portion of said side plate and around said bolt, whereby as said bolt is drawn through said plates it compresses said bearing and lubricating element longitudinally and expands it circumferentially within said bearing eye.

5. In combination a bearing eye, a pair of side plates at the opposite sides thereof, one of said plates having a cylindrical portion in register with said bearing eye, a bolt extending through said side plates and having a head adapted to fit and move within the cylindrical portion of said side plate, and provided at its opposite end with a nut on the outside of said other side plate, and a combination bearing and lubricating element spirally disposed within said eye and within the cylindrical portion of said side plate and around said bolt, whereby as said bolt is drawn through said plates it compresses said bearing and lubricating element longitudinally and expands it circumferentially within said bearing eye.

6. In combination with the bearing eyes of upper and lower springs, side plates at opposite sides of said bearing eyes, one of said side plates being provided with cylindrical portions formed therein and registering with said spring bearing eyes, bolts extending through said plates and said bearing eyes and having heads adapted to fit and move within the cylindrical portions of said side plate, nuts on the opposite ends of said bolts, and a combination bearing and lubricating element spirally disposed around each of said bolts within said bearing eyes and the cylindrical portions of said side plates, whereby as the nuts on said bolts are tightened said combination bearing and lubricating element is compressed longitudinally and expanded circumferentially within said bearing eyes, substantially as described.

Signed at Portland, Multnomah county, this 31st day of May, 1917.

WALTER G. ROYCE.

In presence of—
I. M. GRIFFIN,
J. C. STRENG.